United States Patent [19]
Andrus et al.

[11] 4,083,727
[45] Apr. 11, 1978

[54] GLASS-CERAMICS WITH MAGNETIC SURFACE FILMS

[75] Inventors: Ronald L. Andrus, Elmira; Richard F. Reade, Corning, both of N.Y.

[73] Assignee: Corning Glass Works, Corning, N.Y.

[21] Appl. No.: 757,582

[22] Filed: Jan. 7, 1977

[51] Int. Cl.$^2$ .......................... C03C 3/22; C03B 32/00
[52] U.S. Cl. ........................................ 106/39.7; 65/32; 65/33
[58] Field of Search .................... 65/32, 33; 106/39.7, 106/39.8

[56] References Cited

U.S. PATENT DOCUMENTS

| | | | |
|---|---|---|---|
| 3,464,806 | 9/1969 | Seki et al. | 65/32 |
| 3,557,576 | 1/1971 | Baum | 65/32 X |
| 3,639,113 | 2/1972 | Aslanova et al. | 65/32 |
| 3,790,360 | 2/1974 | Kato et al. | 65/32 |
| 3,892,904 | 7/1975 | Tanaka | 65/32 X |
| 3,902,881 | 9/1975 | Pirooz | 65/32 |
| 3,962,514 | 6/1976 | Rittler | 106/39.7 |

*Primary Examiner*—Richard V. Fisher
*Assistant Examiner*—Frank W. Miga

*Attorney, Agent, or Firm*—Clinton S. Janes, Jr.; Clarence R. Patty, Jr.

[57] ABSTRACT

The instant invention relates to the production of glass-ceramic articles, wherein the predominant crystal phase is beta-quartz solid solution and/or beta-spodumene solid solution, but which have a thin, integral, tightly-bonded surface film containing crystals exhibiting the structure of magnetite. The preferred method of production for such articles requires three general steps. First, a glass article having a particular composition within the $Li_2O$—$FeO$—$Al_2O_3$—$SiO_2$ field nucleated with $TiO_2$ is heat treated in air or other oxidizing atmosphere to yield a glass-ceramic article through the crystallization in situ of beta-quartz solid solution and/or beta-spodumene solid solution crystals. Simultaneously during this heat treatment, a surface layer containing hematite is developed. Second, the glass-ceramic article is subjected to a hot acid bath. Third, the acid-washed article is heat treated in a $H_2O$-containing reducing atmosphere to convert the hematite crystals to magnetite. The resulting films demonstrate high coercive forces and saturation magnetization comparable to that of magnetite and other ceramic ferrite materials.

12 Claims, No Drawings

GLASS-CERAMICS WITH MAGNETIC SURFACE FILMS

BACKGROUND OF THE INVENTION

In U.S. Pat. No. 3,926,602, the present inventors disclosed a process for producing glass-ceramic articles having highly-durable integral surfaces exhibiting distinctly metallic lusters. When developed upon previously-polished surfaces, mirror-like finishes with good color and spatial reproduction of reflected images can be produced.

Such articles were made by melting batches for glasses consisting essentially, by weight on the oxide basis, of about 0.5–3.5% FeO, 3–6% $Li_2O$, 16–21% $Al_2O_3$, 65–75% $SiO_2$, and 1.5–7% $RO_2$, wherein $RO_2$ consisted of 1.5–6% $TiO_2$ and 0–3% $ZrO_2$. The molten batches were cooled to at least within the transformation range (optionally to room temperature) and glass articles shaped therefrom. The glass articles were then exposed to temperatures between about 850°–1025° C. to cause the growth of beta-quartz solid solution crystals in the body interior and an integral surface layer of hematite (alpha-$Fe_2O_3$). This surface film was extremely thin, i.e., less than several thousand angstroms thick.

The body portion of the article was highly crystalline and contained beta-quartz solid solution as the sole or predominant crystal phase. This body portion displayed a degree of transparency depending upon the amount of iron in the base composition. The crystals of beta-quartz solid solution were very fine-grained, viz., less than about five microns in diameter.

Where desired, the glass ceramic article could be heated to about 1050° C. and higher, at which temperatures the article became opaque as a result of the conversion of the beta-quartz solid solution crystals to beta-spodumene solid solution crystals. And, where the heat treatment at 1050° C. and higher was not extended for too long a period, the reflective surface remained intact.

U.S. application Ser. No. 757,585, filed concurrently herewith by the present applicants, discloses the production of highly crystalline glass-ceramic articles having an integral surface layer containing metallic iron crystals, and wherein either beta-spodumene solid solution or nepheline constitutes the predominant crystal phase in the interior of the articles.

The method of the invention comprehends four general steps:

First, a batch of the proper composition is melted;

Second, the melt is simultaneously cooled and a glass article of a desired configuration shaped therefrom;

Third, the glass article is heated treated in an oxidizing atmosphere at about 1000°–1300° C. to cause the crystallization in situ of beta-spodumene solid solution or nepheline in the interior portion of the article while, at the same time, effecting crystallization in situ of alpha-hematite ($Fe_2O_3$) crystals in an integral thin surface layer; and Fourth, the crystallized article is exposed to an essentially dry reducing atmosphere at a temperature about 500°–800° C. to reduce the hematite in the surface layer to metallic iron.

U.S. application Ser. No. 757,584, filed concurrently herewith by the present applicants, discloses the manufacture of glass articles having very thin, integral surface layers containing hematite crystals (alpha-$Fe_2O_3$) or magnetite crystals ($Fe_3O_4$) or metallic iron crystals dispersed within a glassy matrix. The crystal content of the surface layer is very high, i.e., greater than about 50% by volume, such that the crystals provide an essentially continuous film.

The method of that invention for producing a glass having an integral surface layer containing hematite crystals involves two general steps:

First, a batch of the proper composition is melted and formed into a glass article of a desired configuration; and Second, the glass article is subjected in an oxidizing atmosphere to a temperature of at least 675° C., but less than 975° C., to cause the crystallization in situ of hematite crystals in the surface of the glass.

When the glass article having the integral surface layer containing hematite crystals is exposed to a $H_2O$-containing reducing environment at a temperature between about 450°–650° C., the hematite crystals are reduced to magnetite.

In contrast, when the glass article having the integral surface layer containing hematite crystals (or magnetite crystals) is exposed to an essentially dry reducing atmosphere at a temperature between about 450°–650° C., the hematite crystals (or the magnetic crystals) are reduced to metallic iron.

The instant invention is founded in, and is an improvement upon, the invention set forth by the present applicants in U.S. Pat. No. 3,926,602. In essence, the glass-ceramic articles of that patent, having a metallic luster due to an integral thin surface film of hematite, provide the starting point of the present invention. Therefore, reference is specifically made to that patent for further details regarding the composition and process parameters of that invention.

SUMMARY OF THE INVENTION

The instant invention yields glass-ceramic articles having very thin, highly-crystalline, highly-durable, integral surface layers demonstrating magnetic properties. Beta-quartz solid solution and/or beta-spodumene solid solution crystals comprise the sole or predominant crystal phase in the interior portion of the articles, whereas the crystals of the integral surface layer have the structure of magnetite ($Fe_3O_4$).

The method of the invention involves the following steps. First, a glass-forming batch consisting essentially, in weight percent on the oxide basis, of about 1–6% FeO, 3–10% $Li_2O$, 15–40% $Al_2O_3$, 40–75% $SiO_2$, and 2–7% $RO_2$, wherein $RO_2$ consists of 2–6% $TiO_2$ and 0–3% $ZrO_2$, is melted. Second, the melt is simultaneously cooled to a temperature at least within the transformation range and a glass article of a desired configuration formed therefrom. Third, said glass article is exposed in an oxidizing atmosphere to a temperature between about 750°–1025° C. for a period of time sufficient to produce a glass-ceramic article by causing the growth in situ of beta-quartz solid solution crystals in the interior portion and hematite crystals in a thin surface layer. (Where beta-spodumene solid solution crystals are desired in the interior portion, the beta-quartz solid solution-containing article will be heated to a temperature of at least about 1050° C. for a period of time sufficient to cause the conversion of the beta-quartz to beta-spodumene solid solution.) Fourth, said glass-ceramic article is exposed to a $H_2O$-containing reducing atmosphere at a temperature between about 450°–650° C. for a period of time sufficient to reduce the hematite in said surface layer to magnetite ($Fe_3O_4$).

Fifth, said article is cooled to room temperature, normally in the reducing environment.

It has been found that the magnetic properties manifested by the final product are frequently very much improved when the surface layer of hematite crystals is contacted with hot nitric acid ($HNO_3$) prior to exposing the glass-ceramic article to the reducing environment. Therefore, such contact comprises the preferred practice of the invention. Hydrochloric acid (HCl), phosphoric acid ($H_3PO_4$), and sulfuric acid ($H_2SO_4$) have also been found useful, but must be used with caution to avoid attack of the hematite surface layer.

PRIOR ART

U.S. Pat. No. 3,962,514 discloses the production of glass-ceramic articles wherein beta-quartz and/or beta-spodumene solid solution comprises the predominant crystal phase and which have an integral surface layer containing transition metal spinel crystals. As illustrative of such spinel-type crystals, the patent recites $Mn_3O_4$, $Fe_3O_4$, $NiAl_2O_4$, $CoAl_2O_4$, $CuCr_2O_4$, $FeCr_2O_4$, $CoFe_2O_4$, $MnFe_2O_4$, $CrAl_2O_4$, $NiFe_2O_4$, $NiNb_2O_6$, and $MnCr_2O_4$.

The precursor glass compositions for the articles are disclosed as being within the $Al_2O_3$—$SiO_2$ and the $Al_2O_3$—$B_2O_3$ systems with $Li_2O$ or $MnO_2$ as the principal modifying metal oxide. $TiO_2$ and/or $ZrO_2$ is included as a nucleating agent and about 0.1–10% of one or more of the transition metal oxides is required to yield the desired spinel-type crystals.

Crystallization in situ of the parent glass articles to glass-ceramics containing beta-quartz and/or beta-spodumene solid solution crystals is achieved by heating at about 800°–1200° C. The desired integral surface layer containing spinel-type crystals is developed by subsequently heating the glass-ceramic article between about 500°–1000° C. in a gaseous reducing atmosphere at which time the crystals are stated to be exuded to the surface. Several reducing environments are recited as being operable including hydrogen, forming gas, hexane, methane, and ammonia. Where hydrogen or forming gas (92% by volume $N_2$ — 8% by volume $H_2$) is utilized, the patent notes the optional inclusion of CO, $CO_2$, S, or water vapor therewith. However, all of the working examples reported employed either hydrogen or forming gas as the sole component of the reducing atmosphere.

There is no mention of the development of hematite crystals in a surface layer during the crystallization in situ step, nor of the requirement that an oxidizing atmosphere must be present during that step to secure such crystals. On the contrary, the patent speaks of the surface layer being developed through the exuding of a surface crystal phase during heat treatment of the glass-ceramic article in a reducing atmosphere. Such a phenomenon is outside the purview of the instant invention as will be demonstrated hereinafter.

Furthermore, whereas the presence of $Fe_3O_4$ is observed in the exemplary products, nowhere is that phase noted as being present alone such that its development as the sole phase could be studied. Thus, where present, its occurrence was as an adjunct to other phases.

The procedure of the present invention, which is founded upon the initial development of an integral hematite-containing surface layer followed by the subsequent reduction to magnetite, imparts great flexibility in selecting proper time-temperature heat treatments for converting the precursor glass article to a glass-ceramic which will emphasize the development of hematite in the surface layer rather than some other phase. This factor leads, in turn, to the production of highly-crystalline magnetite-containing surface layers that exhibit optimum properties since they are essentially free from unwanted interfering phases. Hence, the method of the invention permits the independent control of both the hematite and magnetite development. For example, the degree of permanent magnetization exhibited by the resultant magnetite surface is a strong function of the thickness of the original hematite surface, which can be optimized by use of an appropriate heat treatment.

The most preferred products of the instant invention involve compositions wherein transition metal oxides other than iron are essentially absent. The presence of other transition metal ions will cause (1) redox reactions to occur among the possible ionic states of the species present, (2) a distribution of those ionic states among network dwelling and network modifying positions, and (3) competition to take place among the magnetic and non-magnetic crystal phases which are formed. Hence, the avoidance of other transition metals precludes the development of undesirable secondary magnetic phases in either the body or the surface portion of the glass-ceramic. Such phases frequently demonstrate very low coercive forces, particularly when formed within the body of the glass-ceramic. Their presence results in a strong, transient magnetic effect being superimposed on the surface magnetic effect provided by the magnetite whenever a magnetic field is applied to the articles. The elimination of extraneous transition metal ions also avoids unnecessary paramagnetic background effects which can be caused by the presence of certain of such ions in the body of the article. All of those factors militate against good control and reproducibility of the magnetic properties of the materials.

The compositions of the present invention permit the ferrimagnetic properties of the final products to be widely varied without concern as to effects caused by the inclusion of extraneous transition metal ions. And, of vital significance, the inventive compositions allow excellent reproducibility in magnetic properties from article-to-article.

DESCRIPTION OF PREFERRED EMBODIMENTS

Table I records a group of approximate glass compositions, expressed in terms of weight percent on the oxide basis, illustrating the operating parameters of the instant invention. The actual batch ingredients can comprise any materials, either the oxide or other compound, which, when melted together, will be converted into the desired oxide in the proper proportion. The batch materials were compounded, mixed together in a ball mill to aid in achieving a homogeneous melt, and thereafter placed into platinum crucibles. The crucibles were positioned in a gas-fired furnace, melted at 1550°–1675° C. for 16 hours, the melts rolled into glass plates having dimensions of about 10 inches × 4 inches × κ inch, and those plates immediately transferred to an annealer operating at 500°–700° C. $As_2O_3$ was added to several of the compositions to perform its conventional function as a fining agent.

In these laboratory examples, the glass plates were cooled to room temperature to permit an examination of glass quality and were annealed to enable sawing thereof into test samples. Such cooling to room temperature is not required for the successful operation of the instant invention, but the glass articles must be cooled to a temperature at least within the transformation range before being heat treated in order to insure fine-grained crystallization in situ. (The transformation range has been defined as that temperature at which a liquid melt is converted into an amorphous solid, that temperature being deemed to lie in the vicinity of the annealing point of the glass.)

TABLE I

|  | 1 | 2 | 3 | 4 | 5 | 6 | 7 | 8 | 9 |
|---|---|---|---|---|---|---|---|---|---|
| $SiO_2$ | 70.6 | 70.4 | 67.7 | 68.2 | 67.7 | 42.6 | 52.7 | 59.7 | 65.0 |
| $Al_2O_3$ | 17.7 | 17.7 | 19.7 | 20.6 | 20.5 | 39.7 | 32.8 | 27.9 | 24.2 |
| $Li_2O$ | 3.7 | 4.5 | 5.2 | 4.9 | 4.9 | 9.2 | 7.6 | 6.4 | 5.6 |
| FeO | 1.6 | 2.7 | 2.4 | 1.3 | 1.3 | 3.4 | 2.8 | 2.4 | 2.1 |
| $TiO_2$ | 3.8 | 4.5 | 5.0 | 5.0 | 4.0 | 3.0 | 2.5 | 2.1 | 1.8 |
| $ZrO_2$ | 1.0 | — | — | — | 1.6 | 1.2 | 1.0 | 0.8 | 0.7 |
| $As_2O_3$ | — | 0.2 | — | — | — | 0.9 | 0.8 | 0.7 | 0.6 |
| $Na_2O$ | 1.6 | — | — | — | — | — | — | — | — |

|  | 10 | 11 | 12 | 13 | 14 | 15 | 16 | 17 | 18 |
|---|---|---|---|---|---|---|---|---|---|
| $SiO_2$ | 69.5 | 68.8 | 68.1 | 67.3 | 71.0 | 67.8 | 66.8 | 66. | 72.9 |
| $Al_2O_3$ | 20.3 | 20.1 | 19.9 | 19.7 | 17.8 | 19.8 | 19.6 | 19.3 | 16.5 |
| $Li_2O$ | 4.6 | 4.6 | 4.5 | 4.5 | 4.7 | 4.9 | 4.1 | 3.3 | 3.9 |
| FeO | 3.1 | 3.0 | 3.0 | 3.0 | 1.8 | 2.0 | 4.0 | 5.9 | 1.5 |
| $TiO_2$ | 2.0 | 3.0 | 4.0 | 5.0 | 4.5 | 5.0 | 5.0 | 4.9 | 4.9 |
| $As_2O_3$ | 0.5 | 0.5 | 0.5 | 0.5 | 0.2 | 0.5 | 0.5 | 0.5 | 0.4 |

|  | 19 | 20 | 21 | 22 | 23 | 24 | 25 | 26 |
|---|---|---|---|---|---|---|---|---|
| $SiO_2$ | 59.8 | 64.5 | 66.3 | 65.6 | 63.8 | 62.0 | 64.6 | 59.6 |
| $Al_2O_3$ | 22.1 | 21.7 | 21.2 | 21.0 | 20.4 | 19.9 | 20.7 | 19.1 |
| $Li_2O$ | 3.5 | 4.5 | 2.6 | 2.5 | 2.5 | 2.4 | 2.5 | 2.3 |
| FeO | 3.6 | 2.7 | 2.6 | 2.6 | 2.5 | 2.5 | 2.6 | 2.4 |
| $TiO_2$ | 2.8 | 3.2 | 3.1 | 3.1 | 3.0 | 2.9 | 3.1 | 2.8 |
| $ZrO_2$ | 1.1 | 1.2 | 1.2 | 1.2 | 1.2 | 1.1 | 1.2 | 1.1 |
| $As_2O_3$ | 0.4 | 0.5 | 0.5 | 0.5 | 0.5 | 0.5 | 0.5 | 0.4 |
| $Na_2O$ | 0.3 | — | — | — | — | — | — | — |
| $P_2O_5$ | 6.3 | — | — | — | — | — | — | — |
| $B_2O_3$ | — | 1.7 | — | — | — | — | — | — |
| MgO | — | — | 2.5 | — | — | — | — | — |
| CaO | — | — | — | 3.4 | — | — | — | — |
| SrO | — | — | — | — | 6.1 | — | — | — |
| BaO | — | — | — | — | — | 8.8 | — | — |
| ZnO | — | — | — | — | — | — | 4.9 | — |
| PbO | — | — | — | — | — | — | — | 12.3 |

Table II sets forth heat treatment Schedules A–L which were applied in air atmosphere to the exemplary compositions of Examples 1–26 utilizing an electrically heated furnace. In the main, the schedules produced highly crystalline glass-ceramic bodies demonstrating lustrous surfaces, although in a few instances where beta-spodumene solid solution was present, non-reflective surfaces were developed. At the conclusion of the crystallization schedule, the bodies were cooled to room temperature at furnace rate, i.e., the electric power was cut off and the furnace allowed to cool with the articles retained therein. This cooling rate was estimated to range about 3°–5° C./minute.

TABLE II

| Schedule A: | Heat at 300° C./hour to 750° C. |
| | Hold thereat for 12 hours |
| Schedule B: | Heat at 300° C./hour to 775° C. |
| | Hold thereat for five hours |
| Schedule C: | Heat at 300° C./hour to 785° C. |
| | Hold thereat for five hours |
| Schedule D: | Heat at 300° C./hour to 800° C. |
| | Hold thereat for five hours |
| Schedule E: | Heat at 300° C./hour to 800° C. |
| | Hold thereat for four hours |
| | Heat at 100° C./hour to 875° C. |
| | Hold thereat for one hour |
| Schedule F: | Heat at 300° C./hour to 800° C. |
| | Hold thereat for four hours |
| | Heat at 100° C./hour to 875° C. |
| | Hold thereat for four hours |
| Schedule G: | Heat at 300° C./hour to 815° C. |
| | Hold thereat for eight hours |
| | Heat at 100° C./hour to 875° C. |
| | Hold thereat for 0.5 hour |
| Schedule H: | Heat at 200° C./hour to 800° C. |
| | Hold thereat for four hours |
| | Heat at 200° C./hour to 1100° C. |
| | Hold thereat for four hours |
| Schedule I: | Heat at 200° C./hour to 800° C. |
| | Hold thereat for four hours |
| | Heat at 200° C./hour to 1100° C. |
| | Hold thereat for four hours |
| Schedule J: | Heat at 300° C./hour to 750° C. |
| | No hold period at that temperature |
| | Heat at 200° C./hour to 850° C. |
| | Hold thereat for two hours |
| | Heat at 200° C./hour to 1250° C. |
| | Hold thereat for four hours |
| Schedule K: | Heat at 300° C./hour to 750° C. |
| | No hold period at that temperature |
| | Heat at 25° C./hour to 850° C. |
| | No hold period at that temperature |
| | Heat at 200° C./hour to 1200° C. |
| | Hold thereat for four hours |
| Schedule L: | Heat at 300° C./hour to 725° C. |
| | No hold period at that temperature |
| | Heat at 25° C./hour to 825° C. |
| | No hold period at that temperature |
| | Heat at 200° C./hour to 1075° C. |
| | Hold thereat for 0.5 hour |

Various other modifications in heating and cooling rates are possible, of course, and such are believed to be well within the ingenuity of the person of ordinary skill in the art.

The beta-quartz solid solution-containing glass-ceramic articles produced at lower heat treating temperatures commonly develop very thin, often partially transmitting, (usually less than 1000A thick) surface films of hematite (alpha-$Fe_2O_3$) with a distinctly metallic, frequently mirrorlike appearance. The colors of such surfaces can range from silvery through brass, gold, violet, and violet-bronze. The beta-spodumene solid solution-containing glass-ceramic articles formed at higher heat treating temperatures (normally 1050°–1250° C.) conventionally exhibit a somewhat thicker surface film (but still less than several thousand angstroms thick) of hematite with, commonly, a non-metallic appearing surface. Thus, the crystallized article may exhibit enamel or earthen appearing textures and vary in coloration from yellow, orange, olive, red-brown, violet-brown, violet, and slate.

Both the body portion of the articles and the integral surface layer containing hematite are highly crystalline, i.e., greater than 50% by volume crystalline.

Although not mandatory, the preferred practice of the invention contemplates contacting the hematite-containing surface layer with a mineral acid such as nitric acid, hydrochloric acid, phosphoric acid, or sulfuric acid. Hot concentrated and dilute nitric acid, dilute sulfuric acid, dilute phosphoric acid, and dilute hydrochloric acid can be operable. Hot concentrated hydrochloric acid, phoshoric acid, and sulfuric acid dissolve the hematite surface layer and so must be employed with care, if used at all. The reaction mechanism by which the acid treatment improves the magnetic properties of the final product is not fully understood but the treatment is believed to remove tramp constituents introduced through manual handling of the samples and/or exposure to the ambient atmosphere, and to insure the absence of any glassy film, commonly less than 100A in thickness, at the surface. Mirror surfaces frequently demonstrate a brighter, more reflective appearance after the acid treatment, suggesting that a fresh $Fe_2O_3$ surface layer has been exposed. In any event, as will be observed in the following table, a brief treatment in boiling concentrated nitric acid was employed more-or-less routinely in the survey of compositions operable in the invention. Although cold or ambient temperature concentrated hydrochloric acid, nitric acid, phosphoric acid, and/or sulfuric acid may be effective, boiling or near-boiling acid was customarily utilized in the composition survey because it significantly improved the resultant magnetic properties in many cases and did not appear to seriously degrade those properties in any sample. Moreover, the solubility of $Fe_2O_3$ is substantially lower in $HNO_3$ than in HCl, $H_3PO_4$, or $H_2SO_4$. Hence, its use minimizes acid attack of the oxide surface layer itself.

After the acid treatment (where employed), the glass ceramic bodies were subjected to a $H_2O$-containing reducing environment at temperatures between about 450°–650° C. Various combinations of hydrogen and steam can be employed for this purpose but the use of forming gas (92% by volume nitrogen and 8% by volume hydrogen) has been preferred since it does not present the safety hazards of hydrogen and is convenient and relatively inexpensive. It has been learned that wet forming gas, i.e., forming gas that has been bubbled through a column of distilled water, is very effective in producing an integral surface layer of magnetite. In the examples reported in the following table, forming gas was passed through a column of distilled water and into a heated furnace-tube at a flow rate of about 100 cc/min.

With a few notable exceptions, the surfaces of the articles after treatment in the reducing atmosphere displayed a much darker appearance than the original surfaces. The initial mirror-like surfaces normally took on a dark gray-to-black coloring which was consistent with the development of a new surface oxide phase having the structure of magnetite, $Fe_3O_4$ or $FeO.Fe_2O_3$. X-ray diffraction analyses of the relatively thick surface layers on the beta-spodumene solid solution glass-ceramic articles have identified the presence of magnetite. Electron diffraction analyses have determined the presence of magnetite in the thin, mirror-like surface layers on the beta-quartz solid solution-containing glass-ceramic bodies. The magnetite crystals appeared to comprise at least 50% by volume of the surface layer.

X-ray diffraction analyses of the surface layer on the beta-spodumene solid solution glass-ceramics have also indicated the presence, in very minor amounts, of crystal phases other than magnetite, but positive identification of these crystals has not been possible. It is believed that they may be $Al_2TiO_5$ or $Fe_2TiO_5$, or a solid solution of those two. Surfaces exhibiting an enamel-like appearance with yellow-to-olive coloring shown X-ray diffraction lines corresponding closely to $Al_2TiO_5$ and $Fe_2TiO_5$, and are the only surfaces which demonstrate neither a change in color nor the development of magnetic properties after exposure to the acid and reducing atmosphere treatments. However, heating the same materials to a higher temperature causes the development of a reddish-brown enamel or an earthen surface appearance which can be made magnetic.

Electron micrographic and secondary X-ray emission analyses of the mirror-like surface layers on the beta-quartz solid solution glass-ceramics and of the enamel and earthen surfaces on the beta-spodumene solid solution glass-ceramics have not been able to confirm the presence of impurities in the magnetite structure except for a possible slight enrichment of $TiO_2$ in the surface layers of the spodumene glass-ceramics.

The glass-ceramic bodies were magnetized and the magnetic properties measured by the application of a strong magnetic field thereto. The strength of the applied magnetic field was increased until the test sample was magnetically saturated. The applied field was then reduced to zero and the degree of permanent magnetization of the sample was measured in terms of the remanent magnetic flux expressed in Maxwells/cm. The coercive force, expressed in Oersteds, necessary to demagnetize the sample was determined by applying an increasing magnetic field of reverse polarity.

Table III sets forth crystallization heat treatments applied to the exemplary compositions of Table I along with a visual description of the resultant body and the internal crystallization thereof, as identified through X-ray diffraction analyses (s.s. symbolizes solid solution). Table III also reports acid treatments and the reducing conditions employed. Finally, values of remanent flux and coercive force are recorded.

TABLE III

| Example No. | Heat Treatment | Visual Appearance | Crystal Phases | Acid Treatment | Reducing Atmosphere | Remanent Flux | Coercive Force |
|---|---|---|---|---|---|---|---|
| 1 | Schedule E | Silver Mirror | Beta-Quartz, s.s. | None | None | None | None |
| 1 | " | " | " | " | Wet forming gas 500° C. - 2 hr. | 0.001 | 640 |
| 1 | " | " | " | Boiling conc. $HNO_3$-3 min. | " | 0.013 | 555 |
| 2 | None | Glassy black after Schedule E in wet forming gas | Beta-Quartz, s.s. | None | Wet forming gas Schedule E | None | None |
| 2 | Schedule F | Silver Luster | " | Boiling conc. $HNO_3$-2 min. | Wet forming gas 525° C. - 2 hr. | 0.023 | 622 |
| 3 | Schedule C | Silver Mirror | " | " | Wet forming gas 475° C. - 2 hr. | 0.010 | 451 |
| 3 | Schedule B | " | Beta-Quartz, s.s. | " | Wet forming gas 525° C. - 5 hr. | 0.021 | 618 |
| 4 | Schedule A | " | " | Boiling 10% by volume HCl - 2 min. | Wet forming gas 525° C. - 2 hr. | 0.024 | 590 |
| 5 | Schedule A | Slightly brassy mirror | " | " | " | 0.034 | 635 |
| 6 | Schedule D | Violet mirror | Beta-quartz s.s. | Boiling conc. $HNO_3$- 2 min. | Wet forming gas 535° C. - 5 hr. | 0.045 | 695 |
| 6 | Schedule E | " | " | " | " | 0.044 | 571 |
| 7 | " | " | " | " | " | 0.044 | 537 |
| 8 | " | Silver mirror | " | " | " | 0.035 | 649 |
| 8 | Schedule J | Flat violet-gray | Beta-spodumene s.s. | Boiling conc. $HNO_3$- 1 min. | " | 0.105 | 774 |
| 9 | Schedule H | Satiny Bronze | " | " | Wet forming gas 525° C. - 5 hr. | 0.017 | 514 |
| 9 | Schedule J | Flat orange-brown | " | " | Wet forming gas 535° C. - 5 hr. | 0.011 | 485 |
| 10 | Schedule F | Gold mirror | Beta-quartz s.s. | Boiling conc. $HNO_3$- 3 min. | Wet forming gas 550° C. - 5 hr. | 0.030 | 522 |
| 10 | Schedule J | Flat red-violet | Beta-spodumene s.s. | Boiling conc. | Wet forming gas | 0.065 | 595 |

TABLE III-continued

| Example No. | Heat Treatment | Visual Appearance | Crystal Phases | Acid Treatment | Reducing Atmosphere | Remanent Flux | Coercive Force |
|---|---|---|---|---|---|---|---|
| 11 | Schedule F | Gold mirror | Beta-quartz s.s. | Boiling conc. $HNO_3$ - 1 min. | 535° C. - 5 hr. Wet forming gas | 0.028 | 520 |
| 11* | Schedule I | Flat red-violet | Beta-spodumene s.s. | Boiling conc. $HNO_3$ - 3 min. | 550° C. - 5 hr. Wet forming gas | 0.052 | 500 |
| 12 | Schedule F | Brassy mirror | Beta-quartz s.s. | Boiling conc. $HNO_3$ - 1 min. | 535° C. - 5 hr. Wet forming gas | 0.027 | 519 |
| 12 | Schedule H | Red-violet luster | Beta-spodumene s.s. | Boiling conc. $HNO_3$ - 3 min. | 535° C. - 5 hr. Wet forming gas | 0.041 | 347 |
| 13 | Schedule F | Steely luster | Beta-quartz s.s. | " | 535° C. - 12 hr. Wet forming gas | 0.025 | 558 |
| 13 | Schedule J | Flat red-violet | Beta-spodumene s.s. | Boiling conc. $HNO_3$ - min. | 535° C. - 5 hr. " | 0.106 | 564 |
| 14 | Schedule G | Silver mirror | Beta-quartz s.s. | Boiling conc. $HNO_3$ - 2 min. | Wet forming gas 525° C. - 2 hr. | 0.017 | 535 |
| 14 | Schedule G | " | " | " | Wet forming gas 550° C. - 2 hr. | 0.028 | 574 |
| 14 | Schedule H | Olive enamel | Beta-spodumene s.s. | Boiling conc. $HNO_3$ - 3 min. | Wet forming gas 535° C. - 12 hr. | None | None |
| 14 | Schedule J | Brown enamel | " | Boiling conc. $HNO_3$ - 1 min. | Wet forming gas 535° C. - 5 hr. | 0.013 | 543 |
| 15 | Schedule A | Silver mirror | Beta-quartz s.s. | Boiling conc. $HNO_3$ - 2 min. | Wet forming gas 550° C. - 5 hr. | 0.021 | 632 |
| 16 | Schedule A | Light violet mirror | " | " | " | 0.030 | 515 |
| 17 | Schedule A | " | " | " | " | 0.029 | 525 |
| 18 | Schedule K | Dull gray-brown | Beta-spodumene s.s. | Boiling conc. $HNO_3$ - 3 min. | Wet forming gas 535° C. - 5 hr. | 0.011 | 522 |
| 19 | Schedule E | Brassy luster | Beta-quartz s.s. | " | " | 0.038 | 566 |
| 20 | Schedule L | Violet mirror | Beta-spodumene s.s. | " | " | 0.043 | 435 |
| 21 | " | Brownish mirror | Beta-quartz s.s. + Beta-spodumene s.s. | Boiling conc. $HNO_3$ - 3 min. | Wet forming gas 535° C. - 5 hr. | 0.016 | 470 |
| 22 | " | Olive enamel | Beta-spodumene s.s. + Beta-quartz s.s. | " | " | 0.004 | 396 |
| 23 | Schedule L | Coppery luster | Beta-spodumene s.s. + Beta-quartz s.s. | " | " | 0.048 | 402 |
| 24 | " | Brownish mirror | Beta-spodumene s.s. | Boiling conc. $HNO_3$ - 3 min. | Wet forming gas 535° C. - 5 hr. | 0.033 | 418 |
| 25 | " | Silver mirror | Beta-quartz s.s. | " | " | 0.019 | 457 |
| 26 | " | Brownish luster | Beta-quartz s.s. + Beta-spodumene s.s. | " | " | 0.013 | 560 |

A study of Table III points up the process parameters vital to the instant invention. Specific observations will be made with respect to several of the examples reported therein.

Thus, the three runs of Example 1 illustrate three factors. First, the glass-ceramic article as-formed with the hematite surface layer does not exhibit ferrimagnetic properties. Second, the glass-ceramic article will exhibit weak magnetism after treatment in a wet reducing atmosphere. Third, the glass-ceramic article will demonstrate good magnetism when subjected to treatment in a mineral acid prior to contact with a reducing environment.

Example 2 illustrates that the magnetizable surface layer of $Fe_3O_4$ cannot be developed directly by crystallizing the base glass article in a wet reducing atmosphere. This phenomenon underscores the basic requirement for the operability of the instant invention, viz., the development of an integral surface layer of hematite during the crystallization in situ of the parent glass body. Thus, the crystallization in situ of the parent glass must be conducted in an oxidizing atmosphere. Otherwise, an integral surface layer containing hematite crystals will not be formed which can subsequently be reduced to magnetite.

Hence, contrary to the mechanism operating in U.S. Pat. No. 3,962,514, supra, crystals are not exuded from the interior portion to the surface of the glass-ceramic body during the firing in a reducing atmosphere. Rather, the instant invention contemplates the crystallization in situ being carried out in an oxidizing atmosphere to cause the growth of hematite crystals in the surface of the body which are thereafter reduced to magnetite.

Thus, as is demonstrated via Example 2, where the crystallization in situ step is conducted in a non-oxidizing atmosphere, the internal crystallization of beta-quartz or beta-spodumene solid solution will occur but no substantial crystallization of an iron-containing phase will develop in the surface thereof. And, without the initial formation of hematite crystals in the surface, there will be no subsequent reduction to magnetite.

The surface thicknesses of Examples 4 and 5 (521A and 546A, respectively) were determined by weight loss techniques. A surface thickness of 550A was measured interferometrically on a sample similar to Example 1. Based upon this information, the magnetization per gram, a recognized material's characteristic, can be determined. A value of 69 electromagnetic units per gram (emu/g) was calculated for Example 4 and 96 emu/g for Example 5. For comparison purposes, it should be noted that magnetite has a level of 93 emu/g and other ferrites of the general formula $RO.Fe_2O_3$ range from about 25–80 emu/g.

Examples 6 and 7 illustrate glass-ceramic articles wherein stable beta-quartz solid solution crystals are formed. The remaining examples develop metastable beta-quartz solid solution crystals during low temperature crystallization which are converted to beta-spodumene solid solution crystals at higher temperatures. Example 8–14, 21–23, and 26 demonstrate this phenomenon. Example 14, exposed to Heat Treatment Schedule H, exhibits an olive enamel-like finish and cannot be made to manifest magnetic properties after further processing. However, as is demonstrated through the use of Heat Treatment Schedule J, firing at 1250° C. leads to a brown enamel-like finish which, after exposure to reducing conditions, will exhibit magnetic properties.

Examples 21-23, containing both beta-quartz solid solution and beta-spodumene solid solution crystals, illustrate the transition that occurs between the beta-quartz phase and the beta-spodumene phase at temperatures above about 1050° C. A longer exposure time would see the complete transition of the beta-quartz to beta-spodumene.

The preferred embodiments are Examples 8 and 13, subjected to Heat Treatment Schedule J, which display high values of remanent magnetic flux, and Example 12, when subjected to Heat Treatment Schedule H, which exhibits a coercive force adequate to produce a permanent magnet, but low enough to provide easy switching from magnetized to demagnetized state by an outside applied field. Such material could, for example, be useful for magnetic recording and erasing.

As was observed above, the action of the acid treatment is not fully understood but is believed to serve two functions: first, to remove surface contaminants acquired during handling of the samples and/or as a result of exposure to the ambient atmosphere; and, second, to remove a possibly-present, thin surface film containing glassy constituents along with iron oxide.

Electron spectrometric analysis can detect all elements, except hydrogen, which are present within the first 50A of a sample surface at concentrations greater than one atomic percent. Such an examination of Example 4, subjectd to Schedule A, manifested, in addition to iron and oxygen, the presence of silicon, carbon, titanium, and, possibly, aluminum. Inasmuch as all four of those elements except carbon are glassy constituents, the existence of a glassy surface film cannot be discounted. The removal of 140A surface depth by $Ar^+$ ion bombardment revealed a surface containing iron and oxygen alone, with none of the glassy components detected in the original surface.

Nitric acid is preferred because $Fe_2O_3$ is but sparingly soluble therein, whereas it exhibits substantial solubility in HCL, $H_3PO_4$, and $H_2SO_4$. Complete removal of the $Fe_2O_3$ surface layer will occur with the latter acids in concentrated form unless care is exercised in their use. Boiling concentrated $HNO_3$ is a strong oxidant which does not appear to adversely affect the magnetic properties of the resultant magnetic film, and in numerous instances significantly improves those properties. The variable efficacy of $HNO_3$ may be a function of the degree of surface contamination or the amount of glassy material present at the surface.

After treatment in acid (particularly in boiling concentrated $HNO_3$), the brightness and reflectivity of the surface are frequently much improved, strongly suggesting the removal of contaminants and the exposure of a fresh surface. Cold or ambient temperature acids are operable but appear to be much less efficient than when hot.

Minor amounts of extraneous compatible metal oxides can be tolerated and may be useful in improving the melting and forming capabilities of the glass, or in altering a particular physical property of the parent glass or of the final glass-ceramic body. The addition of $P_2O_5$ seems to accelerate the production of hematite, whereas $B_2O_3$ and divalent metal oxides, e.g., the alkaline earth metals, PbO, and ZnO, appear to retard hematite growth. The sum of all optional additions will preferably not exceed about 10% of the total composition. However, as was observed above, transition metal oxides other than iron will be essentially absent.

The ranges of components in the $FeO—Li_2O—Al_2O_3—SiO_2—RO_2$ quinary delineated above are required to secure the desired products. Thus, less than about 1% FeO will not assure the formation of a lustrous or mirror-like surface layer, but amounts above the 6% FeO level frequently cause excessive phase separation in the glass body during cooling of the melt and annealing which can lead to cracking, crazing, and dicing of the body. Moreover, high FeO levels may lead to the development of a crystalline magnetic phase in the body portion of the glass-ceramic having properties different from those of the desired magnetic surface layer. This body phase tends to exhibit an objectionably low coercive force, i.e., on the order of only a few Oersteds. The stated amounts of $Li_2O$, $AL_2O_3$, and $SiO_2$ are necessary to develop beta-quartz solution and/or beta-spodumene solid solution crystals in the body portion of the glass ceramic articles.

In general, the best magnetic properties are achieved where the crystallization in situ step is conducted at high temperatures, viz., temperatures greater than 1050° C., such that beta-spodumene solid solution constitutes the predominant crystal phase in the body portion of the glass-ceramic. Therefore, except where a reflective, metallic luster is desired, such articles will comprise the preferred embodiment of the invention.

Table IV indicates the wide range of magnetic properties which can be achieved within a single base glass composition (Example 3 of Table I) through variations in acid treatments and reducing atmospheres applied thereto. Each glass sample was crystallized in situ by heating at 300° C./hour to 785° C. and holding at that temperature for five hours. The resulting body contained beta-quartz solid solution as the predominant crystal phase with a hematite surface layer exhibiting the appearance of a silver mirror.

TABLE IV

| Acid Treatment | Reducing Atmosphere | Remanent Flux | Coercive Force |
|---|---|---|---|
| Boiling conc. $HNO_3$ - 2 min. | Wet forming gas 475° C. - 2 hrs. | 0.010 | 451 |
| " | Wet forming gas 525° C. - 2 hrs. | 0.036 | 493 |
| None | " | 0.035 | 480 |
| Boiling conc. $HNO_3$ - 2 min. | Wet forming gas 525° C. - 5 hrs. | 0.021 | 618 |
| " | Wet forming gas 575° C. - 2 hrs. | 0.030 | 431 |
| " | Wet forming gas 600° C. - 2 hrs. | 0.030 | 552 |
| " | Wet forming gas 650° C. - 2 hrs. | 0.017 | 477 |
| Boiling 10% by volume $H_2SO_4$ - 2 min. | Wet forming gas 525° C. - 2 hrs. | 0.029 | 503 |
| Cold conc. HCl - 2 min. | " | 0.014 | 493 |

Example 14, after heat treatment in accordance with Schedule F, exhibited a silvery, mirror-like surface containing hematite crystals. A surface electrical resistivity of about $1.16 \times 10^{10}$ ohms/square was measured thereon. The sample was thereafter contacted for two minutes with boiling, concentrated $HNO_3$ and then exposed to an atmosphere of wet forming gas for two hours at 525° C. A surface electrical resistivity of about $1.67 \times 10^6$ ohms/square was measured on the resulting surface, this value being typical of the magnetite-containing surfaces which range between about $10^5 - 10^6$ ohms/square.

The surface resistivity of the glass-ceramic bodies fired in a reducing atmosphere to prevent the development of hematite, e.g., in a manner similar to Example 2 in Table III fired in wet forming glass utilizing Schedule E, customarily ranges between about $10^{12} - 10^{13}$ ohms/square.

The mechanism of reduction operating in the wet reducing atmosphere to convert the hematite crystals to magnetite is not fully understood. However, it is believed that partial decomposition of the water takes place in the wet atmosphere during the firing step which yields a small partial pressure of oxygen which is sufficient to stabilize the magnetite. Where a dry reducing atmosphere is employed, Ser. No. 757,585, supra, the hematite is reduced all the way to metallic iron. Such a dry atmosphere will not provide a source of oxygen partial pressure.

We claim:

1. A method for making a glass-ceramic article composed of a body portion and an integral surface layer demonstrating magnetic properties and exhibiting a reflective, metallic luster, said body portion consisting essentially of beta-quartz solid solution crystals dispersed within a glassy matrix and comprising at least 50% by volume of said body portion, and said surface layer consisting essentially of magnetite ($Fe_3O_4$) crystals dispersed within a glassy matrix and comprising at least 50% by volume of said surface layer, consisting of the steps of:
   (a) melting a batch for a glass consisting essentially, in weight percent on the oxide basis, of about 1–6% FeO, 3–10% $Li_2O$, 15–40% $Al_2O_3$, 40–75% $SiO_2$, 2–7% $RO_2$, wherein $RO_2$ consists of 2–6% $TiO_2$ and 0–3% $ZrO_2$, and being essentially free from transition metal oxides other than iron oxide;
   (b) simultaneously cooling the melt to at least within the transformation range and forming a glass article therefrom;
   (c) exposing said glass article in an oxidizing atmosphere to a temperature between about 750°–1025° C. for a period of time sufficient to cause the growth of beta-quartz solid solution crystals in situ in the body portion of said glass article and the growth of hematite crystals in situ in an integral surface layer on said glass article thereby producing a glass-ceramic article;
   (d) exposing said glass-ceramic article to a $H_2O$-containing reducing environment at a temperature between about 450°–650° C. for a period of time sufficient to reduce the hematite crystals in said surface layer to magnetite ($Fe_3O_4$) crystals; and
   (e) cooling said article to room temperature.

2. A method according to claim 1 wherein said glass-ceramic article is contacted with a mineral acid prior to being exposed to said $H_2O$-containing reducing environment.

3. A method according to claim 2 wherein said mineral acid is selected from the group consisting of $HNO_3$, HCl, $H_3PO_4$, and $H_2SO_4$.

4. A method according to claim 1 wherein said $H_2O$-containing reducing environment consists of wet forming gas (92% $N_2$ — 8% $H_2$).

5. A method according to claim 1 wherein said surface layer is no more than several thousand angstroms thick.

6. Glass ceramic article made in accordance with method of claim 1.

7. A method for making a glass-ceramic article composed of a body portion and an integral surface layer demonstrating magnetic properties and exhibiting an enamel-like or earthen appearance, said body portion consisting essentially of beta-spodumene solid solution crystals dispersed within a glassy matrix and comprising at least 50% by volume of said body portion, and said surface layer consisting essentially of magnetite ($Fe_3O_4$) crystals dispersed within a glassy matrix and comprising at least 50% by volume of said surface layer, consisting of the steps of:
   (a) melting a batch for a glass consisting essentially, in weight percent on the oxide basis, of about 1–6% FeO, 3–10% $Li_2O$, 15–40% $Al_2O_3$, 40–75% $SiO_2$, 2–7% $RO_2$, wherein $RO_2$ consists of 2–6% $TiO_2$ and 0–3% $ZrO_2$, and being essentially free from transition metal oxides other than iron oxides;
   (b) simultaneously cooling the melt to at least within the transformation range and forming a glass article therefrom;
   (c) exposing said glass article in an oxidizing atmosphere to a temperature of at least 1050° C. for a period of time sufficient to cause the growth of beta-spodumene solid solution crystals in situ in the body portion of said glass article and the growth of hematite crystals in situ in an integral surface layer on said glass article thereby producing a glass-ceramic article;
   (d) exposing said glass-ceramic article to a $H_2O$-containing reducing environment at a temperature between about 450–650° C. for a period of time sufficient to reduce the hematite crystals in said surface layer to magnetite ($Fe_3O_4$) crystals; and
   (e) cooling said article to room temperature.

8. A method according to claim 7 wherein said glass-ceramic article is contacted with a mineral acid prior to being exposed to said $H_2O$-containing reducing environment.

9. A method according to claim 8 wherein said mineral acid is selected from the group consisting of $HNO_3$, HCl, $H_3PO_4$, and $H_2SO_4$.

10. A method according to claim 7 wherein said $H_2O$-containing reducing environment consists of wet forming gas (92% $N_2$ 13 8% $H_2$).

11. A method according to claim 7 wherein said surface layer is no more than several thousand angstroms thick.

12. Glass ceramic article made in accordance with the method of claim 7.

* * * * *

UNITED STATES PATENT AND TRADEMARK OFFICE
CERTIFICATE OF CORRECTION

PATENT NO. : 4,083,727
DATED : April 11, 1978
INVENTOR(S) : Ronald L. Andrus and Richard F. Reade It is certified that error appears in the above-identified patent and that said Letters Patent are hereby corrected as shown below:

Column 1, line 9, "lypolished" should be -- ly-polished --.

Column 3, line 21, after "$CuCr_2O_4$," insert -- $Co_3O_4$ --.

Column 5, line 38, after "in" insert -- an --.

Column 11, line 39, "HCL" should be -- HCl --.

Column 14, Claim 10, line 3, "(92% $N_2$ 13 8% $H_2$)." should be -- (92% $N_2$ - 8% $H_2$). --

Signed and Sealed this

Twenty-eighth Day of November 1978

[SEAL]

Attest:

RUTH C. MASON
Attesting Officer

DONALD W. BANNER
Commissioner of Patents and Trademarks